(12) United States Patent
Yeung et al.

(10) Patent No.: US 9,323,571 B2
(45) Date of Patent: Apr. 26, 2016

(54) METHODS FOR REDUCING ENERGY CONSUMPTION OF BUFFERED APPLICATIONS USING SIMULTANEOUS MULTI-THREADING PROCESSOR

(75) Inventors: Minerva M. Yeung, Sunnyvale, CA (US); Yen-Kuang Chen, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 3243 days.

(21) Appl. No.: 10/774,178

(22) Filed: Feb. 6, 2004

(65) Prior Publication Data

US 2005/0188189 A1 Aug. 25, 2005

(51) Int. Cl.
| | |
|---|---|
| *G06F 9/46* | (2006.01) |
| *G06F 1/00* | (2006.01) |
| *G06F 9/50* | (2006.01) |
| *G06F 9/38* | (2006.01) |
| *G06F 9/48* | (2006.01) |
| *G06F 1/32* | (2006.01) |

(52) U.S. Cl.
CPC ............... *G06F 9/50* (2013.01); *G06F 1/3203* (2013.01); *G06F 1/324* (2013.01); *G06F 1/3296* (2013.01); *G06F 9/3851* (2013.01); *G06F 9/485* (2013.01); *G06F 9/5011* (2013.01); *G06F 9/5094* (2013.01); *G06F 1/32* (2013.01); *Y02B 60/1217* (2013.01); *Y02B 60/1285* (2013.01); *Y02B 60/142* (2013.01); *Y02B 60/144* (2013.01); *Y02B 60/32* (2013.01)

(58) Field of Classification Search
CPC ......... G06F 1/32; G06F 1/3203; G06F 1/324; G06F 1/329; G06F 9/4881; G06F 9/4893; G06F 9/50; G06F 9/505; G06F 9/5094
USPC ................ 718/100, 102, 104; 709/103, 220; 711/154, 156
See application file for complete search history.

(56) References Cited

U.S. PATENT DOCUMENTS 4,581,701 A * 4/1986 Hess et al. ....................... 700/82
4,811,208 A * 3/1989 Myers et al. .................. 711/132
(Continued)

FOREIGN PATENT DOCUMENTS

| EP | 0 353 051 A2 | 7/1989 | ............. G06F 9/46 |
|---|---|---|---|
| EP | 636985 A1 * | 2/1995 | ............. G06F 11/30 |

(Continued)

OTHER PUBLICATIONS

Mielke et al. "A multi-level buffering and feedback scheme for distributed multimedia presentation systems", IEEE, 1998, pp. 219-226.*

(Continued)

*Primary Examiner* — Meng An
*Assistant Examiner* — Caroline H Arcos
(74) *Attorney, Agent, or Firm* — Blakely, Sokoloff, Taylor & Zafman LLP

(57) ABSTRACT

A state of an application running in a system is monitored. The monitoring of the application states includes monitoring one or more buffers associated with the application. Dispatch of one or more threads in the system is controlled. At least one thread in the system is associated with the application. Resources in the system are managed based at least on the state of the application and the state of the one or more threads in the system.

14 Claims, 8 Drawing Sheets

(56) References Cited

U.S. PATENT DOCUMENTS

| | | | |
|---|---|---|---|
| 5,133,077 A * | 7/1992 | Karne et al. | 712/23 |
| 5,261,076 A * | 11/1993 | Shamshirian | 712/200 |
| 5,450,546 A * | 9/1995 | Krakirian | 710/57 |
| 5,579,452 A * | 11/1996 | Ambalavanar et al. | 358/1.16 |
| 5,640,604 A * | 6/1997 | Hirano | 710/56 |
| 5,668,993 A * | 9/1997 | Peters et al. | 718/101 |
| 5,812,860 A * | 9/1998 | Horden et al. | 713/322 |
| 6,021,457 A * | 2/2000 | Archer et al. | 710/260 |
| 6,092,108 A * | 7/2000 | DiPlacido et al. | 709/224 |
| 6,199,160 B1 * | 3/2001 | Echensperger et al. | 713/100 |
| 6,205,078 B1 * | 3/2001 | Merritt | 365/226 |
| 6,366,879 B1 | 4/2002 | Coxhead et al. | |
| 6,493,741 B1 * | 12/2002 | Emer et al. | 718/107 |
| 6,510,099 B1 * | 1/2003 | Wilcox et al. | 365/230.06 |
| 6,577,602 B1 * | 6/2003 | Beck et al. | 370/241.1 |
| 6,601,112 B1 * | 7/2003 | O'Rourke et al. | 719/312 |
| 6,658,447 B2 * | 12/2003 | Cota-Robles | 718/103 |
| 6,662,203 B1 * | 12/2003 | Kling et al. | 718/103 |
| 6,839,762 B1 * | 1/2005 | Yu et al. | 709/230 |
| 6,862,500 B2 * | 3/2005 | Tzamaloukas | 701/1 |
| 6,865,653 B2 | 3/2005 | Zaccarin et al. | 711/154 |
| 7,006,511 B2 * | 2/2006 | Lanzafame et al. | 370/412 |
| 7,043,608 B2 * | 5/2006 | Sun | 711/135 |
| 7,058,786 B1 * | 6/2006 | Oliveri | 711/203 |
| 7,155,600 B2 * | 12/2006 | Burky et al. | 712/229 |
| 7,185,070 B2 * | 2/2007 | Paul et al. | 709/220 |
| 7,188,198 B2 * | 3/2007 | Beukema et al. | 710/52 |
| 7,213,135 B2 * | 5/2007 | Burky et al | 712/244 |
| 7,222,068 B2 * | 5/2007 | Leaning et al. | 704/201 |
| 2001/0043353 A1 * | 11/2001 | Iizuka et al. | 358/1.14 |
| 2001/0056456 A1 * | 12/2001 | Cota-Robles | 709/103 |
| 2002/0169990 A1 * | 11/2002 | Sherburne, Jr. | 713/300 |
| 2002/0188884 A1 * | 12/2002 | Jain et al. | 713/500 |
| 2003/0115428 A1 * | 6/2003 | Zaccarin et al. | 711/156 |
| 2003/0115495 A1 | 6/2003 | Rawson, III | 713/324 |
| 2003/0137945 A1 * | 7/2003 | Yavatkar et al. | 370/282 |
| 2004/0003019 A1 * | 1/2004 | Ali-Santosa et al. | 709/100 |
| 2004/0003020 A1 | 1/2004 | Yik et al. | 709/102 |
| 2004/0030547 A1 * | 2/2004 | Leaning et al. | 704/211 |
| 2004/0064573 A1 * | 4/2004 | Leaning et al. | 709/231 |
| 2004/0083478 A1 * | 4/2004 | Chen et al. | 718/107 |
| 2004/0198223 A1 * | 10/2004 | Loh et al. | 455/41.1 |
| 2004/0215668 A1 * | 10/2004 | Sun | 707/201 |
| 2004/0216113 A1 * | 10/2004 | Armstrong et al. | 718/104 |
| 2005/0050135 A1 * | 3/2005 | Hallermeier | 709/200 |

FOREIGN PATENT DOCUMENTS

| | | | |
|---|---|---|---|
| EP | 0 978 781 A2 | 7/1999 | G06F 1/32 |
| EP | 1395000 A1 * | 3/2004 | H04L 12/56 |
| JP | H10-069394 | 3/1998 | |
| JP | 11-143727 | 5/1999 | |
| JP | H11-282815 | 10/1999 | |
| JP | 2002-099432 | 5/2002 | |
| JP | 2003-029988 | 1/2003 | |
| WO | WO 03/40912 | 5/2003 | |

OTHER PUBLICATIONS

I Office Action for German Patent Application No. 10 2005 000 307'8'53 mailed Aug. 1,2008, 2 pgs.*

Japanese Office Action mailed Mar. 21, 2012 for Japanese Application No. 2010-188252.*

Christopher J. Hughes et al., "Saving Energy with Architectural and Frequency Adaptations for Multimedia Applications", Proceedings of the 34$^{th}$ Annual International Symposium on Microarchitecture, Dec. 2001, pp. 1-12.

Yen-Kuang Chen et al., "An Apparatus and Method for Reducing Power Consumption on Simultaneous Multi-Threading Systems", U.S. Appl. No. 10/279,630, filed Oct. 23, 2002.

Office Action for Japanese Patent Application No. 2006-552129 mailed Jun. 9, 2009, incl. translation, 6 pgs.

Japanese Office Action mailed May 25, 2010 for Japanese Application No. 2006-552129.

* cited by examiner ns in a system is disclosed. The method includes monitoring buffers associated with a software application and monitoring threads in the system. Available resources (e.g., voltage, frequency, architectural parameters, etc.) may be increased or decreased based on at least one of a current buffer level and thread status.

METHODS FOR REDUCING ENERGY CONSUMPTION OF BUFFERED APPLICATIONS USING SIMULTANEOUS MULTI-THREADING PROCESSOR

FIELD OF THE INVENTION

The present invention relates to the field of computer systems, more particularly relating to methods and apparatus for reducing power consumption of the computer systems.

BACKGROUND

Multi-threading is a technique that split instructions into multiple streams of executions (or threads) so that they may be processed in parallel.

FIG. 1A is a block diagram illustrating an example of a prior art system that can be used to support multi-threading. The system 100 includes two physical processors 105 and 110 and may be used to execute multi-threaded software applications. Each of the physical processors 105 and 110 may include similar set of resources (e.g., architecture states, execution resources, caches, etc.). The two physical processors may share a common system bus 115 and a common main memory 120.

Typically, to increase parallelism, the system 100 may employ a scheduling technique that dispatches a thread whenever the thread is ready to be dispatched.

BRIEF DESCRIPTION OF THE DRAWINGS

The following drawings disclose various embodiments of the present invention for purposes of illustration only and are not intended to limit the scope of the invention.

DETAILED DESCRIPTION

For one embodiment, a method for managing resources in a system is disclosed. The method includes monitoring buffers associated with a software application and monitoring threads in the system. Available resources (e.g., voltage, frequency, architectural parameters, etc.) may be increased or decreased based on at least one of a current buffer level and thread status.

In the following description, for purposes of explanation, numerous specific details are set forth in order to provide a thorough understanding of the present invention. It will be evident, however, to one skilled in the art that the present invention may be practiced without these specific details. In other instances, well-known structures, processes and devices are shown in block diagram form or are referred to in a summary manner in order to provide an explanation without undue detail.

Hyper-Threading Technology is a technology from Intel® Corporation of Santa Clara, Calif. that enables execution of threads in parallel using a single physical processor. Hyper-Threading Technology is a form of simultaneous multi-threading technology (SMT) where multiple threads of software applications may be executed simultaneously on one physical processor. This may be achieved by duplicating the architectural state, with each architecture state sharing one set of processor execution resources.

Figure 1A:
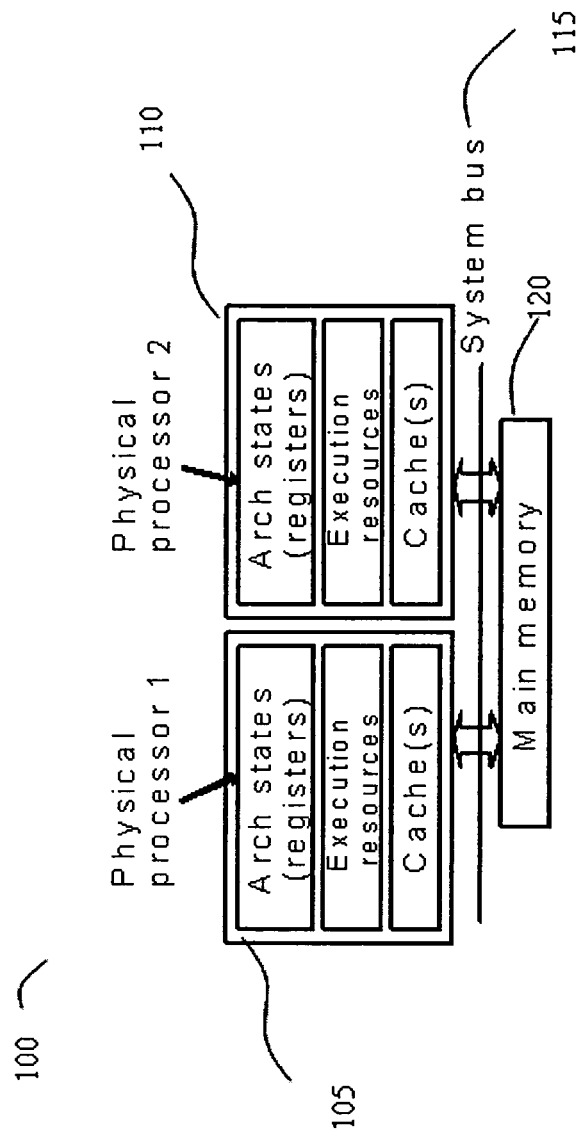
FIG. 1A is a block diagram illustrating an example of a prior art system that may be used to support multi-threading.
Figure 1B:
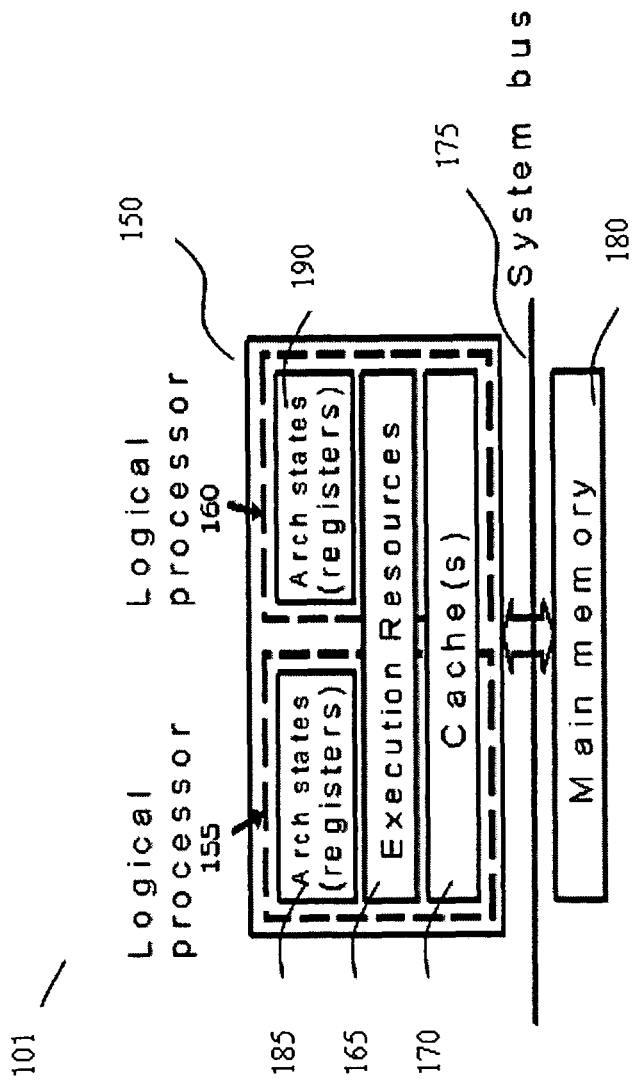
FIG. 1B is a block diagram illustrating an example of a system with a single processor supporting Hyper-Threading Technology, according to one embodiment.

FIG. 1B is a block diagram illustrating an example of a system with a single processor supporting Hyper-Threading Technology. The system 101 includes a physical processor 150 having two architecture states 185, 190 to make the physical processor 150 to be perceived as two logical processors 155, 160. The two logical processors 155, 160 share the same execution resources 165, caches 170, system bus 175 and main memory 180. The physical processor 150 may schedule the multiple threads in interleaved fashion depending on which of the logical processors 155, 160 is available. Hyper-Threading Technology results in increased utilization of processor execution resources 165 and overall throughput.

Hyper-Threading Technology makes the execution units busier and thus the execution units may consume more power in comparison with a processor not supporting Hyper-Threading Technology. Power consumption is becoming an important consideration for modern systems, especially for battery-operated mobile systems. In these battery-operated systems, the average power consumption for a given fixed application may be a crucial parameter to consider for the evaluation of the overall performance of the system. Different techniques for reduction of power consumption have been proposed including, for example, dynamic voltage management (DVM). Using DVM, the performance and the power consumption of a processor may be configured by varying applied frequency and/or voltage.

Application Constraints

Figure 1C:
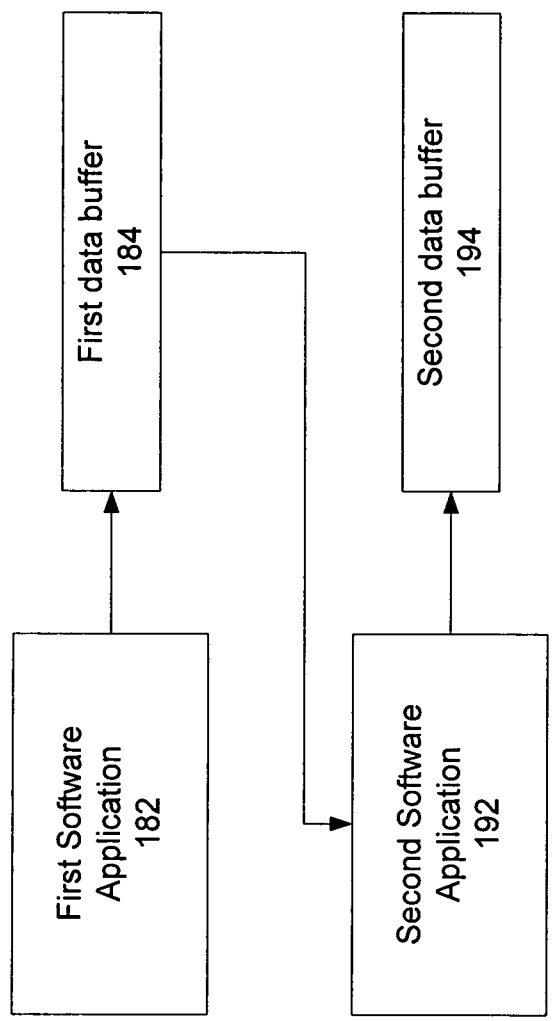
FIG. 1C is a block diagram illustrating an example of applications using data buffer, according to one embodiment.

Many software applications are constrained by data delivery requirements. FIG. 1C is a block diagram illustrating an example of applications using a data buffer, according to one embodiment. As illustrated in FIG. 1C, a first application 182 may generate and store data in first data buffer 184. The data in the first data buffer 184 may then be used as input to a second application 192. The second application 192 may then generate data to be stored in a second data buffer 194. When the first application 182 and the second application 192 are not constrained by any data delivery requirement, arbitrarily varying the frequency of how fast data is stored in the first data buffer 184 or the second data buffer 194, and the frequency of how fast data is retrieved from these buffers may have little impact to the first application 182 and to the second application 192.

However, when the first application 182 and the second application 192 are constrained by some forms of data delivery requirements, not taking this factor into consideration may interfere with user experience and/or software application reliability. For example, for streaming multimedia or other real time applications, a low frequency processor at an inappropriate time may cause the application to fail, causing skipped frames or generating degraded images.

For one embodiment, managing resources in a system may be performed by monitoring one or more software applications that utilize one or more buffers. A software application may include one or more threads. A thread may be dispatched multiple times. There may be two or more threads running concurrently in the system. These threads may be from the same software application or from different software applications. The software applications may include real-time software applications. The system may include one or more processors that support multi-threading (e.g., a processor that supports Hyper Threading technology). The system may be referred to as a multi-threading system.

States

Figure 2:
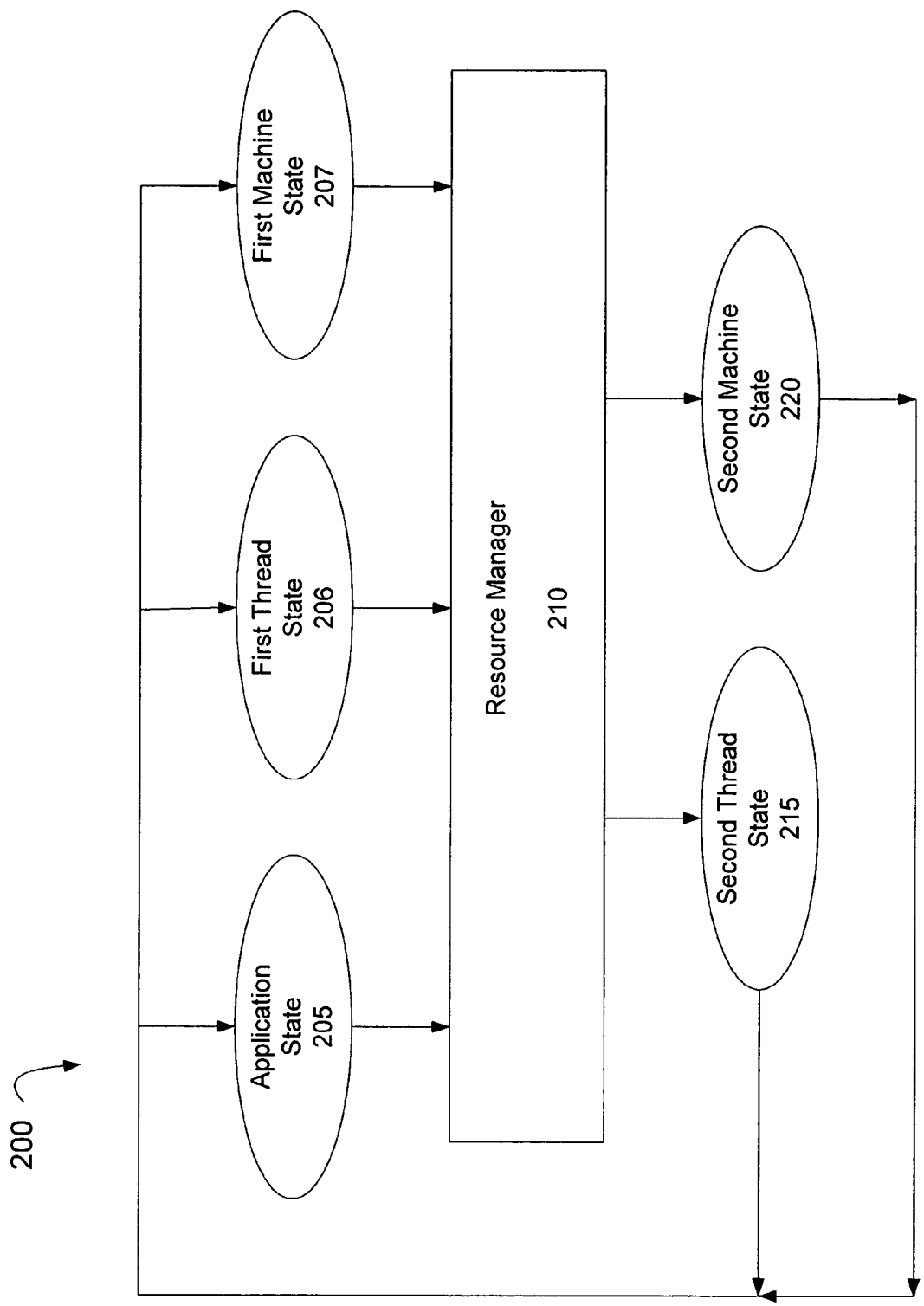
FIG. 2 is a block diagram illustrating different states in a multi-threading system, according to one embodiment.

FIG. 2 is a block diagram that illustrates one example of different states that may be used to manage resources in a multi-threading system, according to one embodiment. System 200 may include an application state 205, a first thread state 206, a first machine state 207, and a resource manager 210. Depending on the application state 205, the first thread state 206, and the first machine state 207, the resource manager 210 may, for example, transition the system 200 from the first machine state 207 to a second machine state 220, and/or transition a thread in the system from a first thread state 206 to a second thread state 215.

Machine State

The first machine state 207 and the second machine state 220 are examples of a state that the system 200 may be in at any particular time. For one embodiment, a machine state may be associated with configurations or performance levels of one or more hardware components in the system 200. A machine state may be related to the levels of frequency and/or voltage applied to the processor, the number of out-of-order entries, the size of hardware buffers, memory, or cache, the arithmetic logic unit (ALU), the registers, etc. For example, the system 200 may be in a low power consumption state (e.g., first machine state 207) when the frequency/voltage applied to the processor is decreased. Similarly, the system 200 may be in a normal power consumption state (e.g., second machine state 220) when the frequency/voltage applied to the processor is increased. There may be many different machine states.

Resource Manager

The resource manager 210 may be responsible for determining the level of resources currently available in the system 200. The resource manager 210 may increase or decrease the available resources, and thus may transition the system 200 from the first machine state 207 to the second machine state 220. For example, the resource manager 210 may perform operations to dynamically scale the frequency and/or voltage applied to a processor in the system 200. The resource manager 210 may also change the size of buffers used by a software application. In general, the resource manager 210 may configure at least a portion of the hardware circuitry in the system 200. The hardware circuitry may include hardware components such as, for example, processor, memory, cache, chipset, etc. Configuring the hardware circuitry may include powering off or powering on one or more hardware components. This may enable the resource manager 210 to indirectly affect the execution of software application. For example, increasing the available resources may cause the software application to execute at a faster rate, and decreasing the available resources may cause the software application to execute at a slower rate.

The resource manager 210 may also conserve resources by transitioning a thread from a first thread state 206 to a second thread state 215. For example, a first thread state 206 may be a ready-to-be-dispatched (or ready) state, and a second thread state 215 may be a delay-from-being-dispatched (or queued) state. Changing the thread state of a thread may change its execution readiness (e.g., from ready to queued, or from queued to ready) and may help reducing the power consumption of the system 200. Note that, depending on the situation, the resource manager 210 may or may not change a thread state of a thread and/or a machine state of the system 200.

Application State

A software application may be in a different application state 205 at any particular time. For example, a software application may be buffering data in a buffer and a current buffer level of the buffer may indicate that the buffer may be close to an underflow condition, representing one application state. As the current buffer level of the buffer changes, the software application may be in a different application state. A current buffer level of a buffer utilized by the software application may be monitored to determine normal condition and potential critical conditions. The critical conditions may include buffer underflow condition, buffer overflow condition, etc.

Depending on the current buffer level and how the buffer is used (e.g., input or output buffer), the rate of how fast data is placed into the buffer or read from the buffer may be increased or decreased. This may require the resource manager 210 to increase or decrease the available resources in the system 200. For example, when a current buffer level of an input buffer indicates a potential buffer overflow condition, the resource manager 210 may increase the size of the input buffer. As another example, the resource manager 210 may increase the frequency/voltage applied to a processor in the system 200.

Figure 3A:
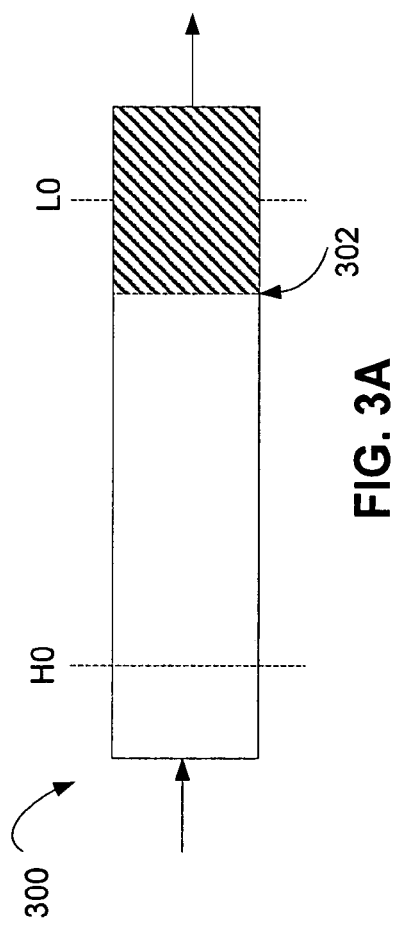
FIGS. 3A and 3B illustrate two examples of buffers that may be used by a software application, according to one embodiment.
Figure 3B:
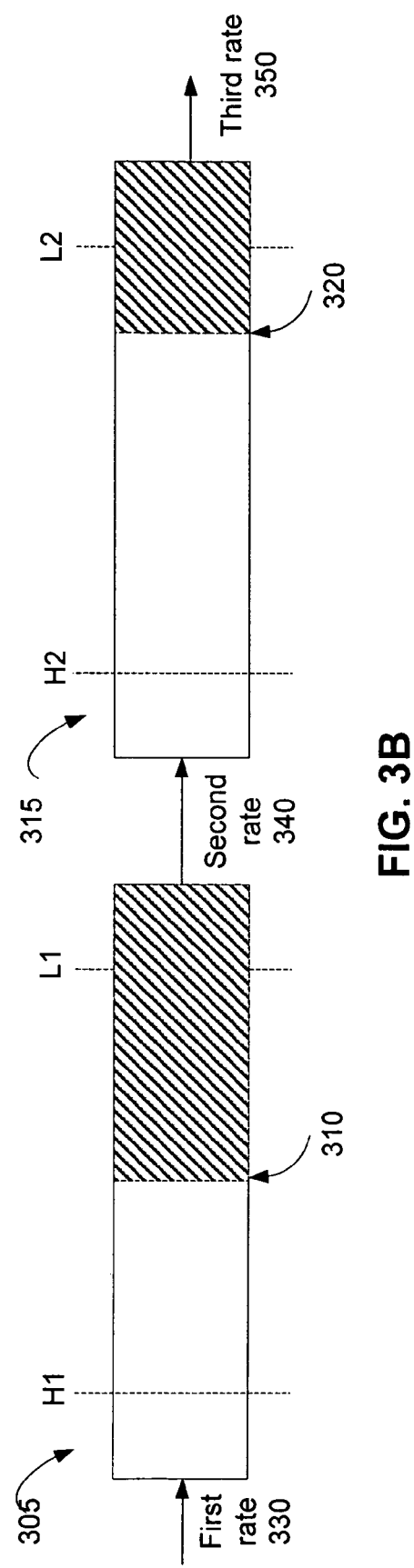

FIGS. 3A and 3B illustrate two examples of buffers that may be used by a software application, according to one embodiment. FIG. 3A illustrates an example of a situation when a software application includes operations involving data in one buffer 300. For example, the software application may read data from the buffer 300. The data may be received into the buffer 300 (as illustrated by the directional arrow leading into the buffer 300) at varying rate, and the software application may have minimal control over that rate.

For one embodiment, a buffer level 302 of the buffer 300 may be used to determine the requirement for resources in the system 200. For example, when the buffer level 302 is below a predetermined low buffer mark L0, the frequency and voltage applied to the processor in the system 200 may be decreased so that the software application may read from the buffer 300 (as illustrated by the directional arrow leaving from the buffer 300) at a slower rate. This may help protect the buffer 300 from a potential buffer underflow condition. Similarly, when the buffer level 302 is above a predetermined high buffer mark H0, the frequency and voltage applied to the processor may be increased so that the software application may read the data from the buffer 300 at a faster rate to protect the buffer 300 from a potential buffer overflow condition. In this example, the shaded area illustrates the data in the buffer 300.

FIG. 3B illustrates an example of a situation when a software application includes operations involving data in two buffers 305 and 315. For one embodiment, each of the buffers 305 and 315 may be associated with a predetermined low buffer mark, L1 and L2, respectively, and a predetermined high buffer mark, H1 and H2, respectively. Associated with each of the buffers 305 and 315 is a current buffer level 310 and 320, respectively. For one embodiment, the software application may be a real-time software application such as, for example, a multimedia software application. One characteristic of real-time software applications is the potential for periodic deadlines such as, for example, a requirement to display video data at 30 frames per second. Such software applications normally may have some buffers to meet at every deadline to ensure smooth playback, reproducing, recording, etc. It may be noted that the term "frame" used in the example may be associated with video applications or audio applications. More generally, the term "frame" may be considered as a piece of data to be processed.

In the current example, the two buffers 305 and 315 may be used in a video decoder process. The buffer 305 may be a bit stream buffer and may receive data (as illustrated by the directional arrow leading into the buffer 305) from a network or a data source at a first rate 330. The first rate 330 may be variable. The data in the buffer 305 may be manipulated by the video decoder process and then stored in the buffer 315 (as illustrated by the directional arrow leading into the buffer 315). The video decoder process may operate at a second rate 340. The buffer 315 may be an uncompressed frame buffer. The data may then be read from the buffer 315 (as illustrated by the directional arrow leaving the buffer 315) to be displayed at a third rate 350. At any given time, the first rate 330, the second rate 340, and the third rate 350 may all be different from one another. For one embodiment, the resource manager 210 may change the machine state of the system 200 and thread state of a thread in the system 200 to change one or more of the first rate 330, second rate 340, and third rate 350. This change may be performed dynamically. This may be necessary because some software applications may have constraints on both incoming data rate and outgoing data rate.

For one embodiment, when there are constraints on both the incoming data rate and outgoing data rate, a combination of the buffer monitoring operations described with FIGS. 3A and 3B may be used to manage the resources in the system 200. Referring to the diagram in FIG. 3B, depending on the buffer fullness levels of the buffers 305 and 315 are, the requirement for resources in the system 200 may be different. For one embodiment, when the buffer level 310 of the buffer 305 indicates that the amount of data in the buffer 305 is either low (below the low level mark L1) or normal (between the low level mark L1 and the high level mark H1), and the buffer level 320 of the buffer 315 indicates that the data in the buffer 315 is high (above the high level mark H2), the requirement for resources may be reduced to reduce the second rate 340. This may include, for example, decreasing the frequency and voltage applied to the processor. This may enable the software application to write the data into the buffer 315 at a slower second rate 340 to protect the buffer 315 from a potential buffer overflow condition.

For one embodiment, when the buffer level 310 of the buffer 305 indicates that the amount of data in the buffer 305 is either normal (between the low level mark L1 and the high level mark H1) or high (above the high level mark H1), and the buffer level 320 of the buffer 315 indicates that the data in the buffer 315 is low (below the low level mark L2), the requirement for resources may be increased to increase the second rate 340. This may include, for example, increasing the frequency and voltage applied to the processor. This may enable the software application to write the data into the buffer 315 at a faster second rate 340 to protect the buffer 315 from a potential buffer underflow condition.

In addition to monitoring the buffer levels 310 and 320, data dependency is a factor that may need to be considered when managing the resources in the system 200. For example, in order to decompress/compress a frame before a deadline, sometimes it may be necessary to decompress/compress an anchor frame earlier. When there is data dependency, the resource manager 210 may need to do something differently than it normally does in order to manage the resources.

In the example where the software application is a video player application (which is different from the video decoder application), the software application may need to re-sample the display rate when the amount of data in the buffers 305 and 315 is high, and when a next frame is dependent on a current frame. Re-sampling the display rate may include, for example, displaying the frames at a rate faster than 1/30 seconds (the normal third rate 350 for a video player application) so that the buffer 315 may have enough space to store the decoded frame which is stored at the second rate 340.

Moreover, the software application may need to drop or discard a frame when a next frame is not dependent on the current frame, and when the amount of data in the buffers 305 and 315 is high (above the high level marks H1 and H2, respectively). For example, a frame removed from the buffer 305 may be dropped instead of being stored in the buffer 315. This may help preventing the potential buffer overflow of the buffers 305 and 315. Dropping or discarding a frame may include, for example, not executing the related thread. The buffering of data and the dependency of data are examples of the application state. Table 1 provides a summary of the above examples where the buffers 305 and 315 illustrated in FIG. 3B are listed in the Table 1 as the bit-stream buffer and the uncompressed frame buffer, respectively. A table entry showing "-" indicates that the information may not relevant for the action to be performed.

TABLE 1

Application States

| Buffer 305 Bit-stream Buffer level? | Buffer 315 Uncompressed frame buffer level? | Next frame depends on this one? | Actions |
|---|---|---|---|
| Low/Normal | High | — | Don't decode frame and decrease CPU resources |
| Normal/High | Low | — | Decode frame and increase CPU resources |
| High | High | Yes | Re-sample the display rate |
| Low | Low | — | Drop frame |
| High | High | No | Drop frame |

Thread State

The thread state may be associated with how threads in the software application are dispatched. As described above, the software application may have multiple threads which may run concurrently. For one embodiment, the dispatch of a thread associated with the software application may be delayed to increase opportunities for multiple threads to run concurrently. Delaying the dispatch of a thread may help reducing the requirement for resources, and thus may allow the system 200 to transition from, for example, the first machine state 207 to the second machine state 220. For example, when there is no other thread running, a thread may be transitioned from a ready-to-be-dispatched (or ready) state (e.g., first thread state 206) to a delayed-from-being-dispatched (or queued) state (e.g., second thread state 215). The thread may be queued or delayed until another thread is ready so that both threads may be dispatched together. It may be noted that the threads that are dispatched together may be associated with the same software application, or they may be associated with different software applications.

Typically, for maximum throughput, ready threads may be immediately dispatched. This may allow the threads to finish as fast as possible. This generally works well for throughput-oriented software applications. Any delay in dispatching the threads may be viewed as possibly impacting the performance of the software application. When one thread finishes its work, it may write data into a buffer for a next thread to work on.

Figure 4B:
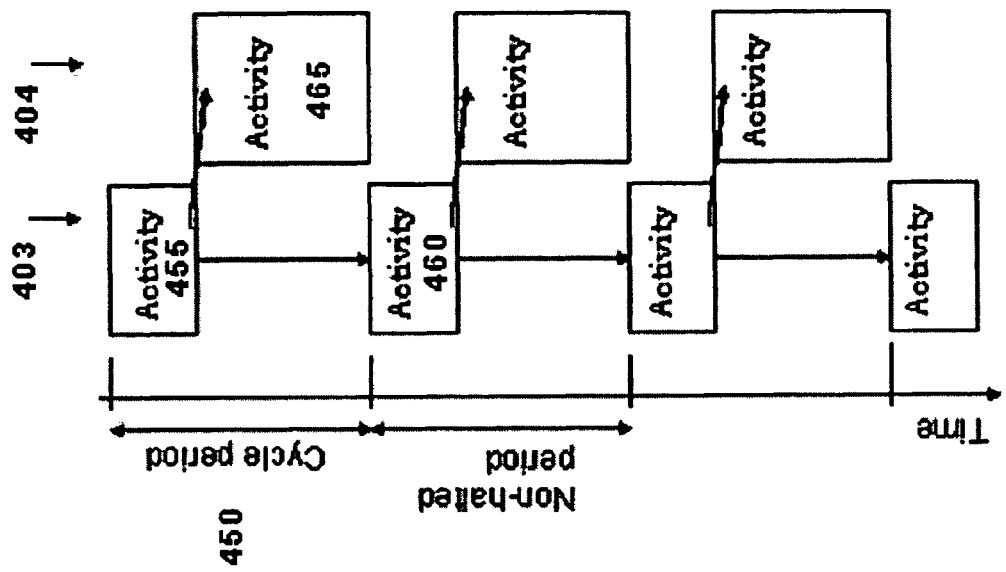
FIGS. 4A and 4B illustrate examples of threads dispatched in a multi-threading system, according to one embodiment.
Figure 4A:
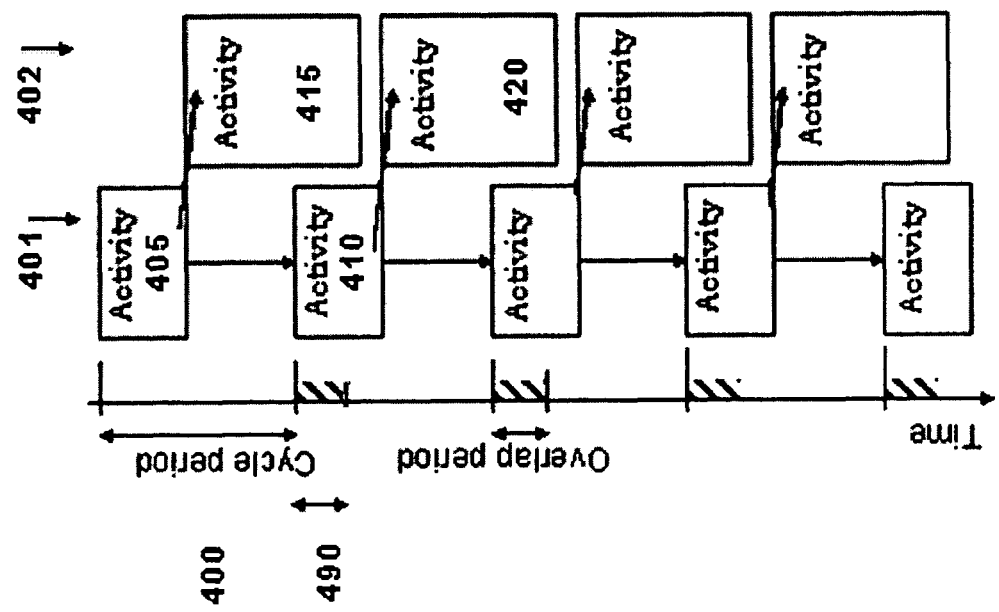

FIG. 4A illustrates two example threads 401 and 402. Each thread may be repeatedly dispatched at different time. In this example, each time a thread is dispatched it is referred to as an activity. For example, the activities 405 and 410 may be associated with the same thread 401 dispatched at different times. Similarly, the activities 415 and 420 may be associated with the same thread 402. In this example, the second thread 402 may be dependent on the first thread 401 and may only be dispatched immediately after completion of the first thread 401. For example, the activity 415 may be dispatched after completion of the activity 405. Similarly, the activity 420 may be dispatched after completion of the activity 410. In a real-time video software application, there may be one thread to capture the video, one thread to encode the bit stream, and another thread to send out the bit stream. These threads may have been naturally synchronized by the video-frame buffer (e.g., buffer 315) and the bit-stream buffer (e.g., buffer 305). Normally, when the data is ready, the next thread will immediately work on the data.

A period between a time when a thread is dispatched (as one activity) and a next time the same thread is dispatched (as another activity) may be referred to as a cycle period. Depending on the software application, the cycle period may be small or large. When the cycle period is small, there may be some execution overlap with another activity. Referring to FIG. 4A, the two activities 405 and 410 are from the same thread 401. In this example, the cycle period 400 between the two activities 405 and 410 is small as compared to the combined execution time of the activity 405 and the activity 415. As such, there is an execution overlap between the activity 410 and the activity 415. The activity 415 may need to wait for the completion of the activity 405 before it is ready to be dispatched. This may be because the execution of the activity 415 depends on the completion and the output of the activity 405. The activity 410, however, may not depend on the completion of the activity 415, and therefore may be dispatched before the completion of the activity 415. Note that this may result in the execution overlap between the activity 410 and the activity 415, as indicated by the overlap period 490.

The activity 415 may be the only activity running until the time when the activity 410 is dispatched. This may mean that, when the system 200 supports multiple logical processors, only one logical processor may be busy executing the activity 415 while the other logical processor may be idle or halted until the activity 410 is dispatched. After the activity 410 is dispatched, the two logical processors may be busy executing the two activities 410 and 415 concurrently during the period 490. The period when the activity 415 is the only activity running may be referred to as a single activity section of the software application, and the period when the activity 415 is running concurrently with the activity 410 may be referred to as a multi-threading section of the software application. Because there is execution overlap, the software application may be completed sooner than if the software application was running with a normal processor that runs one thread at a time.

When the cycle period is large, there may not be any execution overlap among the activities. For example, as illustrated in FIG. 4B, the thread 403 may include the activities 455 and 460, and the thread 404 may include the activity 465. Note that in this example, the cycle period 450 between the activities 455 and 460 is more than the total execution time of the activities 465 and 455. As such, there may be no execution overlap between the activity 460 and the activity 465. In this example, the activity 465 may need to wait for the completion of the activity 455 before it is ready to be dispatched, but the activity 460 may not need to wait for the completion of the activity 465 to be dispatched. When there is no execution overlap among the activities, a multi-threading system 200 may behave like a normal single threading system, and the activities may be viewed as running in serial.

Figure 5:
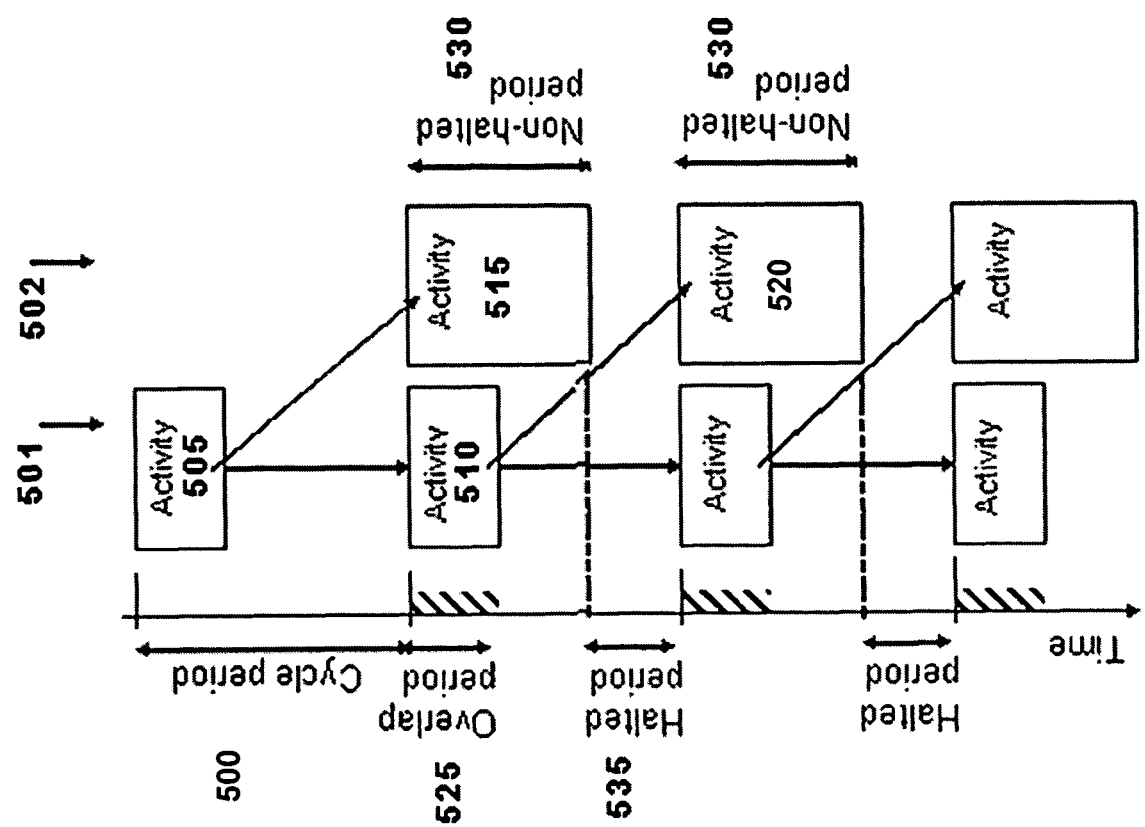
FIG. 5 is a block diagram illustrating an example of threads dispatched in a multi-threading system using a delay dispatch scheme, according to one embodiment.

FIG. 5 is a block diagram illustrating an example of threads dispatched in a multi-threading system using a delay dispatch scheme, according to one embodiment. For one embodiment, instead of dispatching the activities immediately when they are ready to be dispatched, the resource manager 210 may dispatch of the activities in a coordinated manner. For example, the resource manager 210 may coordinate the dispatch of the multiple activities (or threads) so that there is an increase in execution overlap.

The diagram in FIG. 5 illustrates examples of two threads 501 and 502. The thread 501 includes activities 505 and 510. The thread 502 includes activities 515 and 520. In this example, the activity 515 may be in a ready-to-be dispatched state when the activity 505 completes its execution. The ready-to-be-dispatched state may be referred to as a first thread state 206, as described in the example in FIG. 2. However, instead of dispatching the activity 515 immediately after the completion of the activity 505, the resource manager 210 may delay the dispatch of the activity 515 until the activity 510 is ready to be dispatched. The delay state of the activity 515 may be referred to as a second thread state 215, as described in the example in FIG. 2. By delaying, the activity 510 and the activity 515 may be dispatched together so that they may run concurrently. This is illustrated as the overlap period 525.

In some situations, it may be possible that the activity 515 may have to be delayed for more than one cycle period 500 before it may be dispatched so that execution overlap may occur. Alternatively, the dispatch of the activity 515 may not need to be delayed if there is another activity waiting to be dispatched. The dispatch of this other activity may have previously been delayed. In this situation, both activities may be dispatched together.

The period when one or both of the activities 510 and 515 are running may be referred to as a non-halted period 530. During the non-halted period 530, the system 200 may remain busy and consume resources. Note that the non-halted period 530 also includes the overlap period 525. By delaying the dispatch of the activity 515, a period of no execution is introduced. This period may be referred to as a halted or idle period 535. For one embodiment, during the halted period 535, the system 200 may be less busy, and therefore may need fewer resources. For example, when using a processor that supports Hyper-Threading Technology, the requirements for resources may be less during the halted period because both logical processors may be idle. The requirements for resources may be approximately similar when either or both of the logical processors are busy. Thus, it may be advantageous to overlap the busy cycles of one logical processor with those of the other logical processor to conserve resources.

For one embodiment, a time-out scheme may be implemented to avoid delaying a thread more than necessary. For example, the time-out scheme may include setting a predetermined amount of delay by which an activity may be delayed in the queue before being dispatched. For another embodiment, activities may have different priorities, and each priority may be associated with a different delay time before being dispatched. It may be noted that there may be situations when an activity may need to be dispatched without delay even though there may not be any other activity running. For example, an activity may be flagged as critical, and its dispatch is to be performed immediately whenever the activity is ready.

Application State, Thread State, And Machine State

For one embodiment, the resource manager 210 may evaluate the application state of the software application and the thread state of a thread to determine whether to transition the system 200 from one machine state to another machine state. In the example described with FIG. 3B, the thread may include an activity to decode a frame from the buffer 305. Decoding the frame may directly or indirectly affect the amount of data in the buffer 305. When the buffer level 310 of the buffer 305 indicates that the amount of data in the buffer 305 is low (below the low level mark L1), and the buffer level 320 of the buffer 315 indicates that the data in the buffer 315 is normal (between the low level mark L2 and the high level mark H2), the resource manager 210 may evaluate other activities in the system 200 before determining whether to dispatch a current activity. For one embodiment, when there is another activity running, and that activity is related to the current activity (e.g., decoding a frame previous to the current frame), the resource manager 210 may change the machine state of the system 200 by reducing the available resources (e.g., decrease frequency/voltage applied to the processor). This may slow down the execution of the running activity and may decrease the potential of depleting or underflowing the buffer 305 because the amount of data in the buffer 305 is already low.

For another embodiment, when there is another activity running and that activity is not related to the current activity (e.g., the running activity is not decoding a frame previous to the current frame), the dispatch of the current activity may be delayed. This may include, for example, placing a current activity in a queue for one or more cycle period. By delaying the dispatch of the current activity, the potential of depleting the buffer 305 may be reduced.

In general, delaying the dispatch of a set of one or more activities and reducing the available resources may reduce the potential buffer underflow or overflow conditions. Delaying the dispatch of a set of one or more activities may allow more efficient utilization of processor resources on simultaneous multi-threading processors. Table 2 provides a summary of the above examples.

Buffer 305→Bit-stream buffer level→LOW
Buffer 315→Uncompressed frame buffer→NORMAL

TABLE 2

| Thread States Is there another activity decoding a previous frame? | Actions |
| --- | --- |
| Yes | Decrease CPU resources |
| No | Queue the decoding activity |

For one embodiment, when the buffer level 310 indicates that the amount of data in the buffer 305 is normal (between the low level mark L1 and the high level mark H1) and the buffer level 320 indicates that the amount of data in the buffer 315 is normal (between the low level mark L2 and the high level mark H2), the resource manager 210 may evaluate the other activities in the system 200 before dispatching the current activity. When there is another activity running, or when there is another activity ready to be dispatched, the current activity is dispatched by the resource manager 210 so that there may be execution overlap. However, when there is no other activity running, or when there is no other activity ready to be dispatched, the resource manager 210 may delay the dispatch of the current activity. In this situation, the delay may not be dependent on the current buffer levels of data in the buffers 305 and 315 (because they are both at the normal levels). However, the delay may increase the potential for execution overlap, which may help reducing the requirement for resources. Table 3 provides a summary of the above examples.

Buffer 305→Bit-stream buffer level→NORMAL
Buffer 315→Uncompressed frame buffer level→NORMAL

TABLE 3

| Thread States | | |
| --- | --- | --- |
| Is there another thread running? | Is there another thread ready-to-go? | Actions |
| Yes | — | Decode current frame |
| No | Yes | Decode current frame (dispatch both) |
| No | No | Queue the decoding activity |

For one embodiment, when the buffer level 310 indicates that the amount of data in the buffer 305 is high (above the high level mark H1), and the current buffer level 320 of the buffer 315 indicates that the data in the buffer 315 is normal (between the low level mark L2 and the high level mark H2), the resource manager 210 may evaluate the other activities in the system 200 before dispatching the current activity. When there is another activity running, or when there is another activity ready to be dispatched, the current activity may be dispatched so that there is execution overlap. However, when there is no other activity running, and when there is no other activity ready to be dispatched, the resource manager 210 may dispatch the current activity to move data out of the buffer 305 as fast as possible. This is because the amount of data in the buffer 305 is at a high level, and any unnecessary delay in dispatching the current activity may potential cause a buffer overflow condition to occur to the buffer 305. For one embodiment, in addition to dispatching the current activity, the resource manager 210 may also increase the available resources (e.g., increase frequency/voltage applied to the processor) to increase the rate of data read or processed from the buffer 305. This transitions the system 200 from one machine state to another machine state and may help avoiding a potential buffer overflow condition to the buffer 305. Table 4 provides a summary of the above examples.

Buffer 305→Bit-stream buffer level→HIGH
Buffer 315→Uncompressed frame buffer→NORMAL

TABLE 4

| Thread States | | |
| --- | --- | --- |
| Is there another thread running? | Is there another thread ready-to-go? | Actions |
| Yes | — | Decode the frame |
| No | Yes | Decode the frame (dispatch both) |
| No | No | Decode the frame and increase CPU resources |

For another embodiment, the application states and/or thread states may be actively created for resource management in a multi-threading system. For example, applications may be sub-divided into sub-tasks in the form of threads. This may be done even if the application is not multi-threaded. Data buffer may be set up for the threads and used for temporary application data storage. Furthermore, buffer indicator levels may be set up to define buffer overflow and/or underflow conditions. The states of the buffer may then be monitored by determining the current buffer fullness level against the overflow or underflow indicators. By monitoring the states of the buffer and/or the states of the threads, the resources in the multi-threading system may be adjusted.

Figure 6:
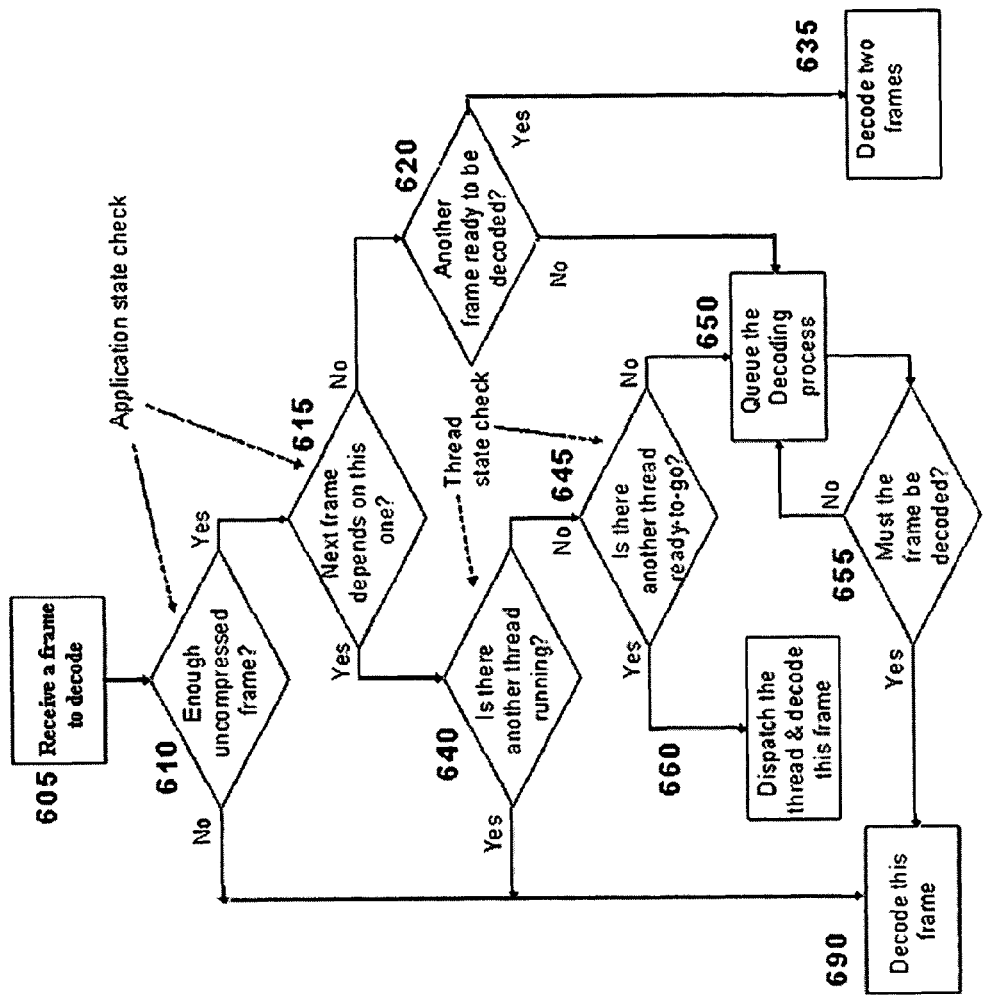
FIG. 6 is a diagram that illustrates an example of a video decoding process, according to one embodiment.

FIG. 6 is a diagram that illustrates an example of a video decoding process, according to one embodiment. At block 605, a frame is received and is ready to be decoded. This frame may be received from a buffer such as, for example, buffer 305 as illustrated in FIG. 3B. At block 610, a test is made to determine if there is enough uncompressed frame in the uncompressed frame buffer such as, for example, buffer 315 as illustrated in FIG. 3B. When there is not enough data in the buffer 315 (e.g., the current buffer level 320 is below the low level mark L2), the process may flow to block 690 where the appropriate decoding activity is dispatched to decode the frame.

From block 610, when there is enough uncompressed frame (in the buffer 315), the process flows to block 615 where a test is made to determine if a next frame depends on the current frame. When the dependency exists, the process flows from block 615 to block 640, where a test is made to determine if there is another activity or thread running. When there is another activity running, the current activity is dispatched to allow for execution overlap.

From block 640, when there is no other activity running, the process flows to block 645 where a test is made to determine if there is another activity ready to be dispatched. This may be an activity that has been previously delayed. When there is an activity ready to be dispatched, the current activity and the activity ready to be dispatched may be dispatched together, as shown in block 660.

From block 645, when there is no other activity ready to be dispatched, the current activity is delayed from being dispatched. This may include, for example, placing the current activity in a queue, as shown in block 650. The current activity may wait in the queue until another activity is ready to be dispatched. For one embodiment, a predetermined time period may be used to limit the time the activity waits in the queue. For another embodiment, a test is made to determine if the current activity cannot be delayed, as shown in block 655, and if the current activity cannot be delayed, the current activity is dispatched, as shown in block 690.

From block 615, when the next frame does not depend on the current frame, the process flows to block 620 where a test is made to determine if there is another frame ready to be decoded. When there is another frame ready to be decoded, the current frame and the other frame are decoded in together (e.g., both activities are dispatched together). From block 620, when there is no other frame to be decoded, the process flows to block 650 where queuing may occur, as described above.

The operations of these various methods may be implemented by a processor in a computer system, which executes sequences of computer program instructions that are stored in a memory which may be considered to be a machine-readable storage media. The memory may be random access memory, read only memory, a persistent storage memory, such as mass storage device or any combination of these devices. Execution of the sequences of instruction may cause the processor to perform operations such as those described in the example of FIG. 6.

The instructions may be loaded into memory of the computer system from a storage device or from one or more other computer systems (e.g. a server computer system) over a network connection. The instructions may be stored concurrently in several storage devices (e.g. DRAM and a hard disk, such as virtual memory). Consequently, the execution of these instructions may be performed directly by the processor. In other cases, the instructions may not be performed directly or they may not be directly executable by the processor. Under these circumstances, the executions may be executed by causing the processor to execute an interpreter that interprets the instructions, or by causing the processor to execute a compiler which converts the received instructions to instructions that which can be directly executed by the processor. In other embodiments, hard-wired circuitry may be used in place of or in combination with instructions to implement the present invention. For example, the resource manager may be implemented to include logic to perform one or more operations described above (e.g., monitoring application states, monitoring thread states, adjusting resources, etc.). Thus, the present invention is not limited to any specific combination of hardware circuitry and software, or to any particular source for the instructions executed by the computer system.

Methods and systems for managing resources in systems have been disclosed. The requirement for resources may be decreased or increased by monitoring the buffering of data and coordinating the dispatch of threads of the software applications. This may help increasing processor idle time.

Although the present invention has been described with reference to specific example embodiments, it will be evident that various modifications and changes may be made to these embodiments without departing from the broader spirit and scope of the invention as set forth in the claims. For example, although the description refers to the dispatch of threads and activities, the techniques described may also be used to schedule other entities such as, for example, processes, tasks, segments of processes, segments of tasks, etc. Furthermore, the techniques may also be used with other multi-threading processors and may not be limited to processors that support Hyper Threading technology. For example, the processor may be one that has dual cores and that is capable of executing multiple threads concurrently. Accordingly, the specification and drawings are to be regarded in an illustrative rather than a restrictive sense.

What is claimed is:

1. A method, comprising:
   monitoring a state of a multi-threaded application running in a system and a buffer associated with the multi-threaded application, wherein each thread includes one or more activities to be executed by the system;
   determining availability of a processor to perform simultaneous multi-threading and the buffer;
   coordinating dispatch of threads of the multi-threaded application to increase execution overlap of activities executing in the system based, at least in part, on the availability of the buffer;
   dynamically adjusting one or more of a frequency or a voltage applied to the processor based, at least in part, on the availability of the buffer and the coordination of the dispatch of the threads; and
   dynamically adjusting the buffer size based, at least in part, on the adjusted voltage or frequency applied to the processor and the coordination of the dispatch of the threads.

2. The method of claim 1, wherein coordinating dispatch of the threads of the multi-threaded application includes assessing execution readiness of the one or more activities of each thread.

3. The method of claim 2, wherein coordinating dispatch of the threads of the multi-threaded application includes delaying a ready-to-be-dispatched activity from being dispatched.

4. The method of claim 3, wherein a first activity is delayed from being dispatched to wait for a second activity to be ready so that both the first and second activities are dispatched together, and wherein the first and second activities are from one or more applications.

5. The method of claim 1, further comprising
determining the availability of configurable hardware components including an arithmetic logic unit (ALU), and registers in the system, wherein coordinating dispatch of the threads of the multi-threaded application is further based on the availability of the configurable hardware components.

6. The method of claim 5, wherein adjusting the voltage applied to the processor includes powering on or powering off at least a portion of circuitry in the system.

7. The method of claim 1, wherein monitoring the buffer associated with the multi-threaded application includes monitoring buffer fullness levels of the buffer.

8. The method of claim 7, wherein monitoring the buffer fullness levels includes comparing the buffer level with predetermined buffer fullness levels, wherein the predetermined buffer fullness levels include a high level mark and a low level mark.

9. The method of claim 8, wherein comparing the buffer level includes determining buffer overflow and buffer underflow conditions based, at least in part, on the high level mark and the low level mark.

10. A non-transitory computer readable storage medium containing executable instructions which, when executed in a processing system, causes the processing system to perform a method comprising:
monitoring a state of a multi-threaded application running in the processing system and a buffer associated with the multi-threaded application, wherein each thread includes one or more activities to be executed by the processing system;
determining availability of a processor to perform simultaneous multi-threading and the buffer;
coordinating dispatch of threads of the multi-threaded application to increase execution overlap of activities executing in the system based, at least in part, on the availability of the buffer;
dynamically adjusting one or more of a frequency or a voltage applied to the processor based, at least in part, on the availability of the buffer and the coordination of the dispatch of the threads; and
dynamically adjusting the buffer size based, at least in part, on the adjusted voltage or frequency applied to the processor and the coordination of the dispatch of the threads.

11. The computer readable storage medium of claim 10, wherein coordinating dispatch of the threads of the multi-threaded application includes delaying a ready-to-be-dispatched activity from being dispatched.

12. The computer readable storage medium of claim 10, wherein monitoring the buffer associated with the multi-threaded application includes monitoring buffer fullness levels of the buffer, and wherein monitoring the buffer fullness levels includes comparing the buffer level with predetermined buffer fullness levels, wherein the predetermined buffer fullness levels include a high level mark and a low level mark.

13. A system, comprising:
a memory to store data and instructions;
a processor coupled to said memory on a bus, said processor operable to perform instructions, said processor to include a bus unit to receive a sequence of instructions from said memory;
an execution unit coupled to said bus unit, said execution unit to execute said sequence of instructions, said sequence of instructions to cause said execution unit to:
monitor a state of a multi-threaded application running in the system and a buffer associated with the multi-threaded application, wherein each thread includes one or more activities to be executed by the system;
determine availability of a processor to perform simultaneous multi-threading and the buffer;
coordinate dispatch of threads of the multi-threaded application to increase execution overlap of activities executing in the system based, at least in part, on the availability of the buffer;
dynamically adjust one or more of a frequency or a voltage applied to the processor based, at least in part, on the availability of the buffer and the coordination of the dispatch of the threads; and
dynamically adjust the buffer size based, at least in part, on the adjusted voltage or frequency applied to the processor and the coordination of the dispatch of the threads.

14. The system of claim 13, wherein said coordinating dispatch of the threads of the multi-threaded application includes delaying a ready-to-be-dispatched activity from being dispatched.

* * * * *